United States Patent
Florentzson et al.

(10) Patent No.: US 8,668,071 B2
(45) Date of Patent: Mar. 11, 2014

(54) TURNING WHEEL

(75) Inventors: Markus Florentzson, Staffanstorp (SE); Tobias Wegbrant, Furulund (SE); Johnny Månsson, Hyllinge (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 13/500,750

(22) PCT Filed: Oct. 5, 2010

(86) PCT No.: PCT/EP2010/006071
§ 371 (c)(1),
(2), (4) Date: Apr. 6, 2012

(87) PCT Pub. No.: WO2011/042155
PCT Pub. Date: Apr. 14, 2011

(65) Prior Publication Data
US 2012/0199442 A1 Aug. 9, 2012

(30) Foreign Application Priority Data
Oct. 9, 2009 (SE) .................................. 0901291

(51) Int. Cl.
*B65G 47/24* (2006.01)
*B65G 47/252* (2006.01)
*B65G 47/248* (2006.01)

(52) U.S. Cl.
CPC ............ *B65G 47/252* (2013.01); *B65G 47/248* (2013.01)
USPC .......................................... 198/403; 198/404

(58) Field of Classification Search
USPC ................... 198/867.1, 803.13, 402, 403, 406
See application file for complete search history.

(56) References Cited

U.S. PATENT DOCUMENTS

| | | | | |
|---|---|---|---|---|
| 1,815,372 | A * | 7/1931 | Frazier | ........................ 198/803.1 |
| 1,892,670 | A | 1/1933 | Jaeger | |
| 3,834,516 | A | 9/1974 | Reeser | |
| 4,058,202 | A | 11/1977 | Reist et al. | |

(Continued)

FOREIGN PATENT DOCUMENTS

| | | | |
|---|---|---|---|
| CH | 575 303 A5 | 5/1976 | |
| DE | 27 15 121 A1 | 10/1978 | |

(Continued)

OTHER PUBLICATIONS

International-Type Search Report and Swedish Search Report dated Apr. 29, 2010, issued in corresponding International Application No. 0901291-5 (13 pages).

(Continued)

*Primary Examiner* — James R Bidwell
(74) *Attorney, Agent, or Firm* — Buchanan Ingersoll & Rooney PC

(57) ABSTRACT

A turning wheel comprising a number of blades. Each blade has a front side provided with a front projection, and a back side provided with a back projection. Each two consecutive blades form a gap between the backside of a first blade and a front side of a second blade. The gap comprises an inner gap formed radially inward from the back projection and the front projection. During rotation of the turning wheel a container can be held in the gap and an end portion of the container can be held in the inner gap, thereby protecting the end portion from being damaged.

8 Claims, 5 Drawing Sheets

(56) References Cited

U.S. PATENT DOCUMENTS

| | | | |
|---|---|---|---|
| 4,076,113 A * | 2/1978 | Shields | 198/403 |
| 4,250,688 A | 2/1981 | Lingenfelder | |
| 4,768,642 A | 9/1988 | Hunter | |
| 6,290,054 B1 | 9/2001 | Buechi | |
| 6,364,089 B1 * | 4/2002 | Singh et al. | 198/408 |
| 2009/0113848 A1 | 5/2009 | Santi | |
| 2010/0006588 A1 | 1/2010 | Klaiber et al. | |

FOREIGN PATENT DOCUMENTS

| | | |
|---|---|---|
| DE | 39 06 635 A1 | 9/1990 |
| DE | 10 2006 055 962 A1 | 6/2008 |
| EP | 0 061 663 A2 | 10/1982 |
| EP | 0 903 308 A1 | 3/1999 |
| EP | 1 726 526 A1 | 11/2006 |
| GB | 2 182 025 A | 5/1987 |
| WO | 20081017915 A2 | 2/2008 |

OTHER PUBLICATIONS

International Search Report (PCT/ISA/210) issued on Jan. 21, 2011, by European Patent Office as the International Searching Authority for International Application No. PCT/EP2010/006071.

* cited by examiner

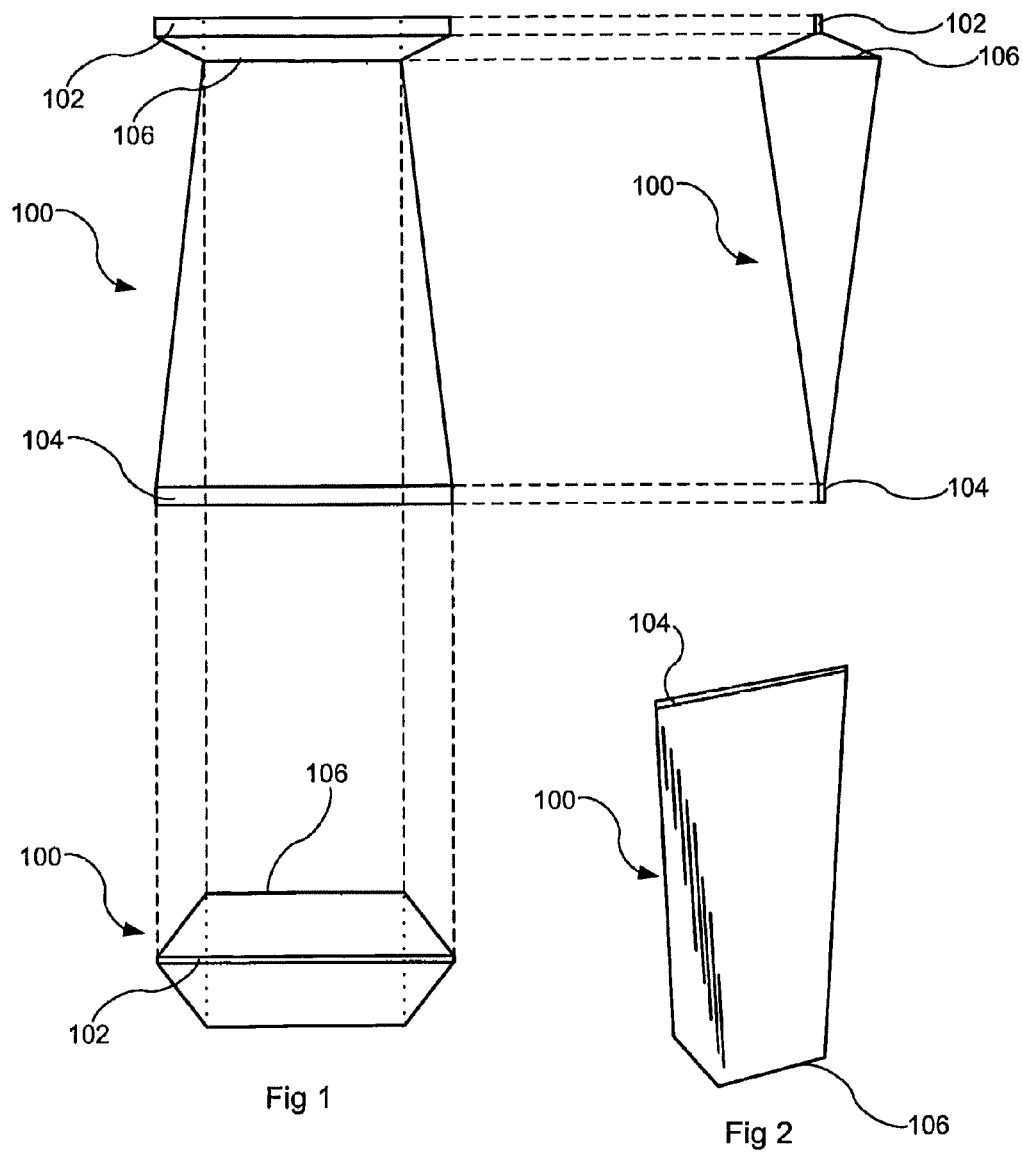

TURNING WHEEL

TECHNICAL FIELD

The invention generally relates to the field of automation. More particularly, the invention relates to a turning wheel for turning containers half a turn, an apparatus comprising the turning wheel and a method for turning containers.

BACKGROUND OF THE INVENTION

Apparatuses for packaging liquid food in containers comprise a number of steps. In short, such an apparatus may comprise the steps of forming a tube of a web of packaging material, filling said tube with the liquid food, forming containers from the tube by transversally sealing and cuffing the tube, and folding the containers to their final form. Further, the folding step can be divided into a number of sub-steps. For example, during a first folding sub-step performed in association to the sealing and cutting step, a section of a container being sealed may be formed to have a rectangular cross-section. In a second folding sub-step, the container may be folded in such a way that a rectangular base is achieved, e.g. by folding the outer ends of the sealing end into the middle of the sealing.

When transporting the container from the first folding sub-step to the second folding sub-step it is important that the sealing ends of the container are not damaged, since this will increase the risk of a non-optimal folding in the second folding sub-step, which in turn may imply that the container leaks. Another problem, if the sealing ends are severely damaged, is that the container may get stuck and hence cause a machine interruption.

Further, some apparatuses are designed in such a way that the containers should, apart from being transported to the second folding sub-step, be turned half a turn, i.e. 180 degrees. Since the sealing ends should be handled carefully, as described above, it is important that the turning of the containers is made without damaging the sealing ends.

Thus, there is a need for a device turning containers half a turn without damaging the sealing ends of the containers.

SUMMARY

In view of the above, an objective of the invention is to solve or at least reduce the problems discussed above. In particular, an objective is to provide a device for turning containers carefully, reliably and quickly.

The general idea is to introduce a turning wheel arranged to receive containers, which are transported with one end facing in a transport direction, from a conveyor belt and to leave the containers, with the other end facing in the transport direction, on the same conveyor belt or another conveyor belt. The turning wheel is arranged such that the containers are held between gaps formed between consecutive blades. In order to protect the ends of the containers the blades are provided with projections such that an inner gap is formed for each gap. By having these inner gaps the containers may be rotated with a reduced contact between the turning wheel and the ends of the containers. Thus, the risk of damaging the ends of the containers is reduced.

According to a first aspect it is provided a turning wheel comprising a number of blades, each blade having a front side facing in a direction of rotation and comprising a front projection, and a back side facing against the direction of rotation and comprising a back projection, each two consecutive blades forming a gap between said backside of a first blade of said two consecutive blades and a front side of a second blade of said two consecutive blades, said gap comprising an inner gap radially inward from said back projection of said back side of said first blade and said front projection of said front side of said second blade, such that a container can be held in said gap and an end portion of said container can be held in said inner gap during rotation of said turning wheel.

An advantage with such a turning wheel is that the container is in contact with the turning wheel during the entire turning process, which means that turning of the container is made in a controlled and reliable manner. This implies less damaged sealing ends as well as less machine interruptions.

The front projection may be placed at a first radius from said rotation axis and said back projection may be placed at a second radius from said rotation axis, wherein said second radius is greater than said first radius.

Further, the turning wheel may be divided into a first side portion and a second side portion connected to each other via an axis coinciding with said rotation axis.

Moreover, an angle between two consecutive blades can be less than 30 degrees. For instance, if having 16 blades the angle between two consecutive blades is 22.5 degrees.

The front projection and the back projection may be smooth, such that the container may continuously be switched during rotation of the turning wheel from resting on both of the projections to one of the projections, or from resting on one of the projections to the other one of the projections.

According to a second aspect an apparatus is provided. The apparatus may comprise a turning wheel according to the first aspect, and an engine for turning said turning wheel.

Further, the apparatus may comprise a conveyor belt configured to convey a container into said gap.

Moreover, the apparatus may comprise a container lifting element configured to lift a container into said gap.

The conveyor belt may comprise a plurality of conveyor belt projections forming a plurality of transport pockets, wherein said conveyor belt and said engine may be configured such that when said turning wheel is turned one turn said conveyor belt is moved a number of transport pockets, said number of transport pockets being equal to said number of gaps of said turning wheel.

Further, the conveyor belt may in use be placed above said rotation axis of said turning wheel.

According to a third aspect it is provided a method for turning a container having an end portion by using a turning wheel having a number of blades. Each blade has a front side facing in a direction of rotation and comprising a front projection, and a back side facing against the direction of rotation and comprising a back projection. Each two consecutive blades form a gap between said backside of a first blade of said two consecutive blades and a front side of a second blade of said two consecutive blades. The gap comprises an inner gap radially inward from said back projection of said back side of said first blade and said front projection of said front side of said second blade. The method comprises receiving said container in said gap, and turning said container half a turn by rotating said turning wheel while holding said container in said gap and said end portion in said inner gap.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, wherein:

FIG. 1 illustrates a container, being folded in a first folding step, from a first side view, a second side view and seen from above.

FIG. 2 illustrates a container being folded in the first folding step and in a second folding step.

DETAILED DESCRIPTION OF PREFERRED EMBODIMENTS

A container 100, formed of a tube or a blank of packaging material, may comprise a first sealing end 102 and a second sealing end 104. During sealing and cutting, a section 106 of the container 100 may be formed to have a rectangular cross-section. Thus, after sealing and cutting the container 100 can obtain a shape as illustrated in FIG. 1. In order to facilitate the forming of containers from the tube or the blank, creasing lines, or in other words weakening lines, may be used, herein illustrated by dotted lines.

In a subsequent folding step, the first sealing end 102 can be folded down and, thereafter, the outer ends of the first sealing end 102 can be folded into the middle of the first sealing end 102, thereby forming a rectangular base of the container 100, as illustrated in FIG. 2. In order to obtain a proper folding, the first sealing end 102 should be handled with care during transportation to a folding device performing the subsequent folding step.

Further, due to the design of a filling machine, i.e. a machine packaging food in containers, it can be necessary to turn the container 100 half a turn, i.e. 180 degrees, during transportation to the folding device, which in the particular example illustrated implies that instead of transporting the container 100 with the first sealing end 102 first, the container 100 is transported with the second sealing end 104 first. When turning the container the risk increases of damaging the first sealing end 102 and the second sealing end 104, in this case, especially the first sealing end 102 since this is to be folded.

Thus, in order to achieve proper folding of containers, the end portions of the containers should be handled carefully. This is applicable to containers in general, and thus the container 100 illustrated in FIG. 1 and FIG. 2 is only to be considered as an example. The container may, for instance, also be a bottle having an end portion consisting of a threaded spout, which is to be handled carefully during rotation.

Figure 3:
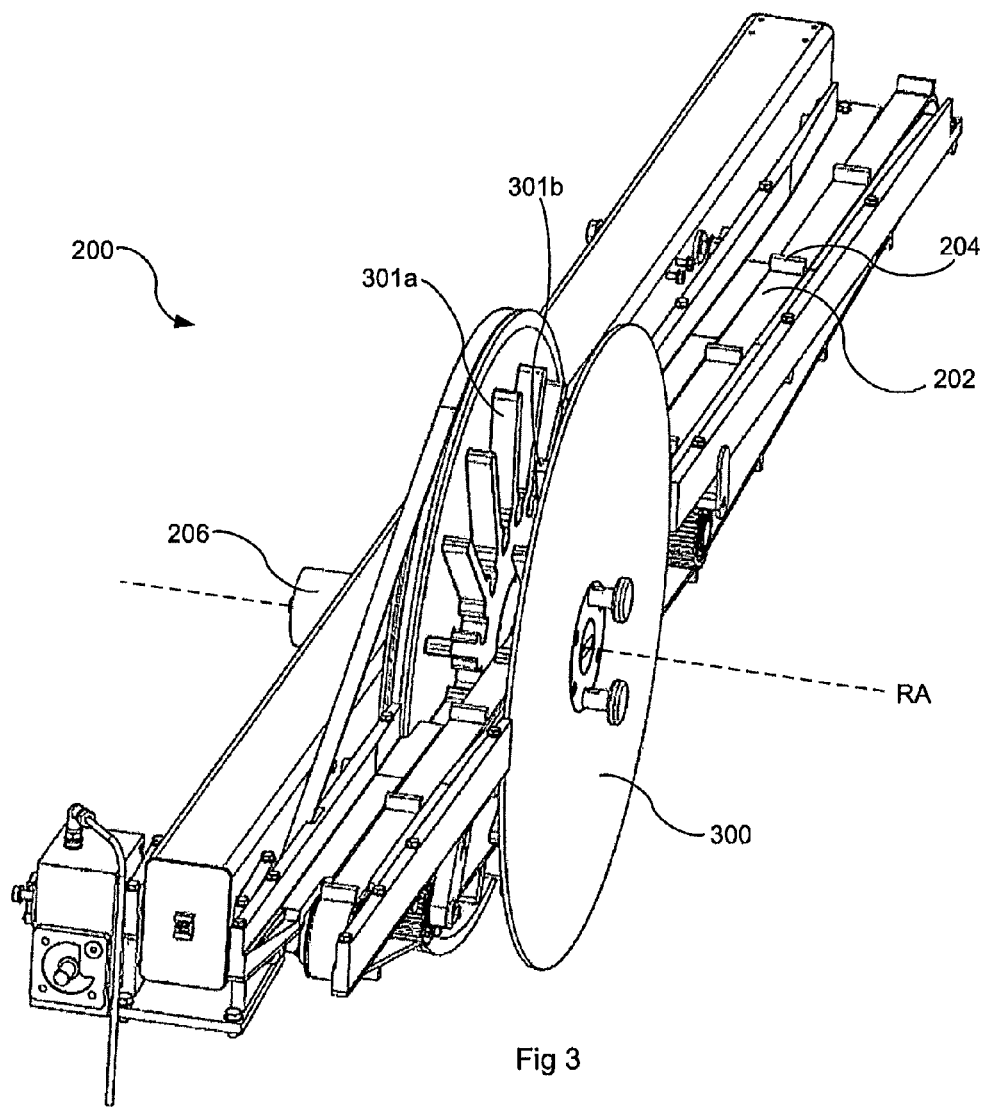
FIG. 3 illustrates an apparatus comprising a turning wheel.
Figure 4:
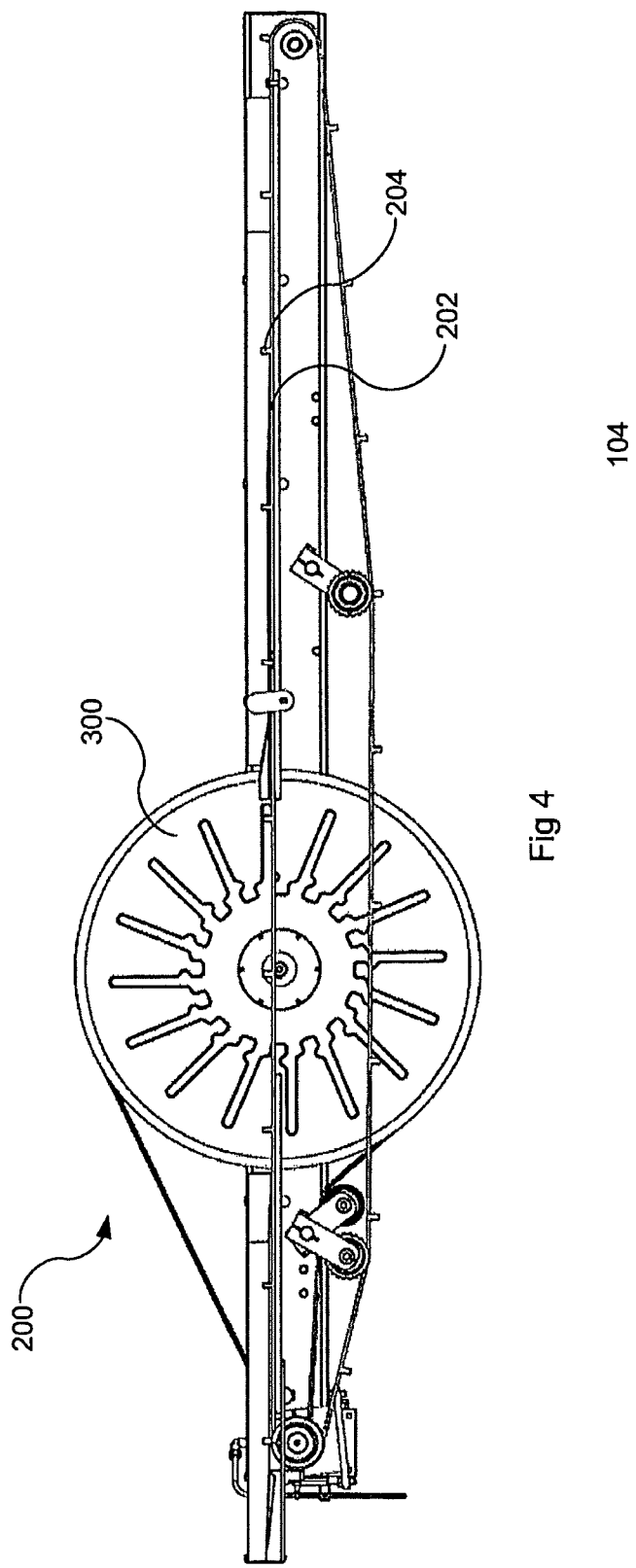
FIG. 4 is a side view of the apparatus illustrated in FIG. 3.

FIG. 3 and FIG. 4 illustrate an apparatus for 200 for transporting containers and during transportation turning the containers half a turn, i.e. 180 degrees. More particularly, the apparatus 200 can comprise a conveyor belt 202 provided with a number of conveyor elements 204 forming a number of pockets for the containers, and a turning wheel 300 driven by an engine 206. The apparatus 200 can form a part of a filling machine or be a separate unit.

Figure 5:
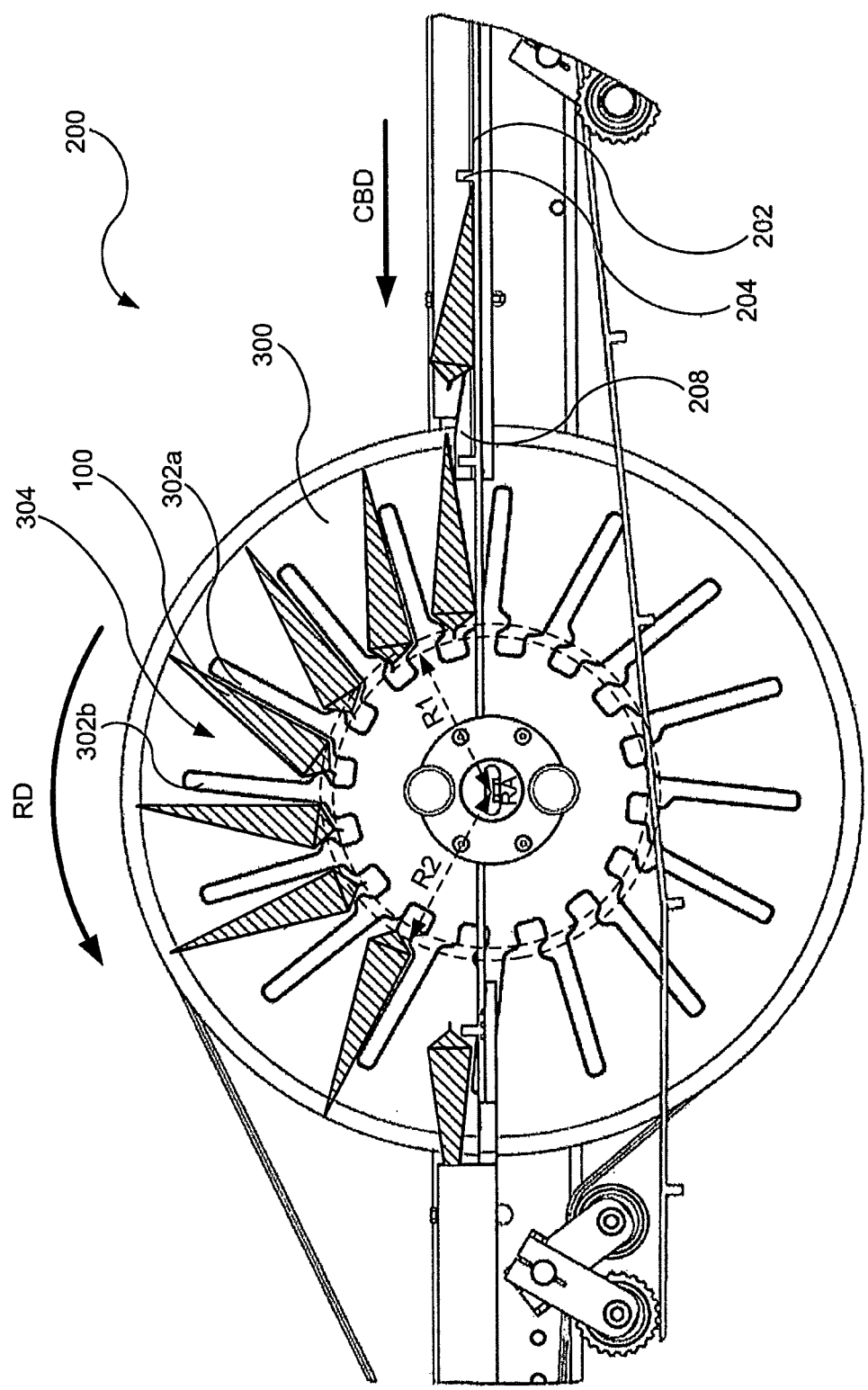
FIG. 5 illustrates the apparatus in further detail.

In further detail, as illustrated in FIG. 5, the turning wheel 300 can comprise a number of blades 302a, 302b, and run in a direction of rotation RD around a rotation axis RA. In use, the rotation axis RA is a horizontal axis. The conveyor belt 202 interacting with the turning wheel 300 can run in a conveyor belt direction CBD. The direction of rotation RD and the conveyor belt direction CBD can be arranged such that when the container 100, placed on the conveyor belt 202, reaches the turning wheel 300 it is introduced into a gap 304 between two consecutive blades 302a, 302b of the turning wheel 300. Thereafter, the container 100 is lifted from the conveyor belt 202 due to the rotation of the turning wheel 300 and transported in the direction of rotation RD.

In order to provide a smooth transaction from the conveyor belt 202 to the gap 304, a container lifting element 208 may be used. The container lifting element 208 can be wedge-shaped and placed next to the turning wheel 300 such that the container 100 can be pushed up on the container lifting element 208 by the conveyor element 204, and then into the gap 304. Advantageously, a height of the container lifting element 208 is greater than a height of the conveyor element 204, such that the conveyor element 204 may pass under the container 100 when this is inserted in the gap 304, as illustrated in FIG. 5. Thus, by having the container lifting element 208, there is a reduced risk that the containers 100 are squeezed between the conveyor elements 204 and the turning wheel 300.

After having been turned half a turn the container 100 can be returned to the conveyor belt 202, alternatively to another device, such as another conveyor belt. In order to achieve a smooth and reliable transaction from the turning wheel 300 to the conveyor belt 202, the conveyor belt 202 may be placed above the rotation axis RA. Further, the rotational speed of the turning wheel 300 and the speed of the conveyor belt 202 can be adjusted such that the container 100 is returned between two conveyor elements 204. Generally, the speeds can be adapted such that a container is placed in each of the pockets of the conveyor belt 202. As an example, in the embodiment illustrated in FIG. 5, the turning wheel provided with 16 blades is rotated 1/16 turn when the conveyor belt is moved a pocket length, i.e. a distance between two consecutive conveyor elements 204.

Further, as illustrated in FIG. 3, the turning wheel 300 may be divided into a first side portion 301a and a second side portion 301b. The conveyor element 202 may run between the first side portion 301a and the second side portion 301b. An advantage of such an arrangement is that less or no modifications of the conveyor belt 202 is needed.

Figure 6:
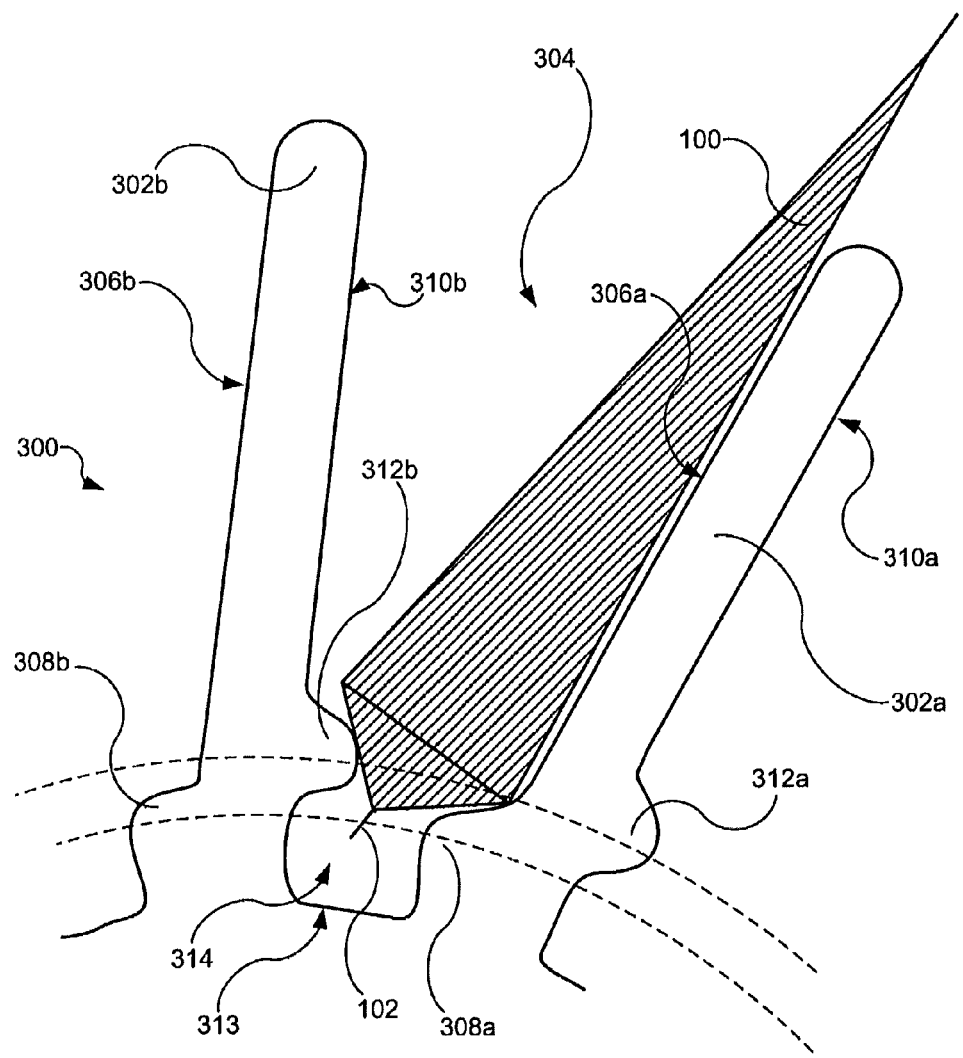
FIG. 6 illustrates the turning wheel in further detail.

More particularly, as illustrated in FIG. 6, the blades 302a, 302b can comprise a front side 306a, 306b provided with a front side projection 308a, 308b, a back side 310a, 310b provided with a back side projection 312a, 312b. The front side projection 308a of the blade 302a, the back side projection 312b of the blade 302b and a bottom 313 can form an inner gap 314. When holding the container 100 in the gap 304, the container 100 can be in contact with the front side projection 308a and the back side projection 312b as well as the front side 306a or the back side 310b, as illustrated in FIG. 5. The switch from resting on the front side 306a of the blade 302a to resting on the back side 310b of the blade 302b occurs when the container 100 due to the gravitation falls from the front side 306a to the back side 310b. In order to facilitate this switch the front side projection 308a and the back side projection 312b may be smooth, as illustrated in FIG. 6, thereby providing for that the container 100 is not damaged. During the rotation, due to the design of the turning wheel 300, the first sealing end 102 can be held within the inner gap 314 such that the first sealing end 102 does not come in contact with the turning wheel 300, which implies that the risk that the first sealing end 102 is damaged is reduced.

In an alternative embodiment, since the container 100 is held by one or two of the projections, the bottom 313 can be omitted, e.g. by having the blades 302a, 302b connected to the rotational axis RA individually.

Further, as illustrated in FIG. 5 and FIG. 6, maximum points of the front side projections 308a, 308b may be placed at a radius R1 from the rotation axis RA and maximum points of the back side projections 312a, 312b may be placed at a radius R2 from the rotation axis RA, where the radius R2 is larger than the radius R1. The advantage of having the back projections 312a, 312b placed further away from the rotation axis RA than the front projections 308a, 308b is that the container 100 can be transferred away from the rotation axis RA when the container 100 switches from resting on the front side 306a to resting on the back side 310b. By transferring the container 100 away from the rotation axis RA the container 100 will more easily be moved from the turning wheel 300 to the conveyor belt 202. Moreover, since the surface between the container 100 and the back side 310b of the blade 302b is reduced, the friction is reduced, thereby making it easier to push the container 100 from the turning wheel 300 to the conveyor belt 202 by using the conveyor belt elements 204 or for the container 100 to slide off the back side 310b.

Further, when having front side projections 308a, 308b and back side projections 312a, 312b placed at different radii from the rotational axis RA, the container 100 may be in contact with the front side projection 308a and the back side projection 312b when being received by the turning wheel 300, as illustrated in FIG. 5. An advantage of this is that the contact pressure on the container 100 during in-feed is reduced.

The shape of the front side projections 308a, 308b and the back side projections 312a, 312b may be adapted to the shape of the container 100. For instance, the inclination of sections, placed between the first sealing end 102 and the section 106, and the inclination of the front side projection 308a and the back side projection 312b may be adapted to each other in order to provide a smooth operation.

Since the container 100 may extend out from the gap 304, as illustrated in FIG. 5 and FIG. 6, and the front side projection 308a and the back side projection 312b may be designed to suit packages of different form and size, it is possible to use the same turning wheel 300 for different types and sizes of containers 100.

In order to provide a good interaction between the turning wheel 300 and the conveyor belt 202, the turning wheel 300 may be divided in two parts making it possible for the conveyor belt 202 to run between the two parts, as illustrated in FIG. 3. However, another alternative, not illustrated, is to have two different conveyor belts, a first one for leaving containers 100 to the turning wheel 300 and a second one for retrieving containers 100 from the turning wheel 300.

The general principle of protecting an end portion of a container during rotation is applicable to containers in general having an end portion to be protected. Thus, apart from protecting the sealing end 102 of the container 100, the general principle of the turning wheel 300 may also be applicable to other types of packages, such as a bottle having a threaded spout to be protected.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A turning wheel comprising
    a number of blades,
        each blade having
            a front side facing in a direction of rotation and comprising a front projection, and
            a back side facing against the direction of rotation and comprising a back projection,
        each two consecutive blades forming
            a gap between said backside of a first blade of said two consecutive blades, and a front side of a second blade of said two consecutive blades, said gap comprising
                an inner gap radially inward from said back projection of said back side of said first blade, and said front projection of said front side of said second blade,
            such that a container can be held in said gap and an end portion of said container can be held in said inner gap during rotation of said turning wheel,
    wherein said front projection is placed at a first radius from said rotation axis and said back projection is placed at a second radius from said rotation axis, wherein said second radius is greater than said first radius.

2. The turning wheel according to claim 1, wherein said turning wheel is divided into a first side portion and a second side portion connected to each other via an axis coinciding with said rotation axis.

3. The turning wheel according to claim 1, wherein an angle between two consecutive blades is less than 30 degrees.

4. The turning wheel according to claim 1, wherein said front projection and said back projection are smooth.

5. An apparatus comprising
    a turning wheel including a number of blades,
        each blade having
            a front side facing in a direction of rotation and comprising a front projection, and
            a back side facing against the direction of rotation and comprising a back projection,
        each two consecutive blades forming
            a gap between said backside of a first blade of said two consecutive blades, and a front side of a second blade of said two consecutive blades, said gap comprising
                an inner gap radially inward from said back projection of said back side of said first blade, and said front projection of said front side of said second blade,
            such that a container can be held in said gap and an end portion of said container can be held in said inner gap during rotation of said turning wheel,
    an engine for turning said turning wheel,
    a conveyor belt configured to convey a container into said gap
    wherein said conveyor belt comprises a plurality of conveyor belt projections forming a plurality of transport pockets, and
    wherein said conveyor belt and said engine are configured such that when said turning wheel is turned one turn said conveyor belt is moved a number of transport pockets, said number of transport pockets being equal to said number of gaps of said turning wheel.

6. The apparatus according to claim 5, further comprising a container lifting element configured to lift a container into said gap.

7. The apparatus according to claim 5, wherein said conveyor belt is in use placed above said rotation axis of said turning wheel.

8. A method for turning a container having an end portion using a turning wheel having a number of blades, each blade having a front side facing in a direction of rotation and comprising a front projection, and a back side facing against the direction of rotation and comprising a back projection, each two consecutive blades forming a gap between said backside of a first blade of said two consecutive blades and a front side of a second blade of said two consecutive blades, said gap comprising an inner gap radially inward from said back projection of said back side of said first blade and said front projection of said front side of said second blade, wherein said front projection is placed at a first radius from said rotation axis and said back projection is placed at a second radius from said rotation axis, wherein said second radius is greater than said first radius, said method comprising
    receiving said container in said gap, and
    turning said container half a turn by rotating said turning wheel while holding said container in said gap and said end portion in said inner gap.

* * * * *